2,860,111

THERMOSETTING POLYESTER COMPOSITION CONTAINING MOLYBDENUM DISULFIDE AND METHOD OF MAKING BEARINGS THEREFROM

Edward Wesley Rolle, San Diego, Calif.

No Drawing. Application April 16, 1953
Serial No. 349,332

3 Claims. (Cl. 260—22)

(Granted under Title 35, U. S. Code (1952), sec. 266)

The invention described herein may be manufactured and used by or for the Government of the United States of America for governmental purposes without the payment of any royalties thereon or therefor.

This invention relates to a plastic composition and more particularly to a thermosetting resinous composition for forming self-lubricating bearings and bearings formed therefrom.

Numerous thermoplastic and thermosetting resins have been proposed for use as a bearing material for forming machine bearings, gears, cams and other moving and wearing mechanical parts in various types of machines.

Certain thermoplastic compositions have been utilized for these purposes such as the high molecular weight polyamide, commonly known by the trade name of "nylon," and solid ethylene polymers. These bearings had many advantages such as reduced frictional resistance, were noncorrosive, noncorrodible, and provided heat, sound, vibration, and electrical insulation between various parts of the mechanism, and were light in weight. However, these bearings were not sufficiently strong and hard to withstand high stresses and pressures, and were not sufficiently resistant to heat that is generated during operation under severe operating conditions. Moreover, such thermoplastic materials tend to soften and flow at elevated temperatures and therefore have low dimensional stability under these conditions. The dimensional stability of nylon toward moisture is only fair, and mineral acids attack nylons fairly rapidly. The moulding of bearings and other machine parts of thermoplastic resins requires heat and high pressures with expensive equipment and such resins could not be cast in a liquid state at room temperature in any desired shape with relatively simple molds. Furthermore, it is very difficult to incorporate any form of powdered lubricant in such a material.

Other plastic bearings, gears, and machine parts have been made from thermosetting phenolic resins for certain uses. However, they were relatively brittle, and would not stand up under severe operating conditions.

The plastic composition of the present invention retains all of the favorable characteristics of both types of plastics previously utilized for forming a bearing or other similar machine part and has a further reduced frictional resistance, has a much higher hardness particularly at elevated temperatures, as indicated on the Rockwell "M" scale; and furthermore the powdered lubricant is easily mixed into the liquid resin prior to polymerization. The resin can be readily cast and cured in any desired shape. The resulting bearing is highly resistant to heat generated by friction during use as a bearing and maintains its dimensional stability at elevated temperatures.

In one preferred embodiment of the present invention a bearing is formed from a polymerized mixture of 30 percent by volume of molybdenum disulfide with approximately 70 percent by volume of a thermosetting resin preferably one of the polyester resins such as those disclosed in the patent application Serial No. 292,015, filed June 5, 1952, by Edward Rolle, either with or without the added ingredients specified therein. One thermosetting polyester resin which has outstanding characteristics making it particularly suitable for use in carrying out the broad concept of the present invention is Example V disclosed in the above application which polymerizes with extreme rapidity, so that the molybdenum disulfide is maintained in a uniformly homogeneous suspension in the final plastic casting after polymerization. The molybdenum disulfide is mixed into the liquid resin as rapidly as possible immediately after the peroxide has been added which initiates the reaction and polymerization. In a liquid state the resinous material containing the molybdenum disulfide is easily cast into any desired shape by simply pouring it into a suitable form.

The plastic bearing material formed from the above thermosetting resin has a high tensile and compressive strength, high resistance to impact, is harmless to any materials which might be commonly used in conjunction with a bearing surface and is highly resistant to the heat normally generated in a bearing. The casting is preferably machined to provide a suitable bearing surface and expose the particles of molybdenum disulfide which are distributed uniformly throughout the resulting plastic casting to further reduce the friction at the bearing surface. The molybdenum disulfide will tend to spread over the plastic at the bearing surface and form a bearing having a minimum of friction.

One object of the present invention is to provide a novel thermosetting resinous composition for forming a self-lubricating bearing having a low frictional resistance without lubrication in contact with most materials commonly utilized in machines.

Another object of the present invention is to provide a plastic composition suitable for forming a low friction lubricantless bearing and having high compressive strength, high resistance to impact, excellent dimensional stability at elevated temperatures, and high resistance to heat.

A still further object of the present invention is to provide a novel plastic bearing material which is extremely resistant to corrosion from oils, acids, alkalies, sea water and most organic solvents whereby the bearing may be used under extremely adverse operating conditions.

Still another object of the present invention is to provide a plastic composition for bearings having a reduced frictional resistance without lubrication and excellent machineability whereby the bearing may be machined to any desirable shape and bearing surface.

A further object of the present invention is a provision of a self-lubricating bearing having excellent mechanical characteristics, a high resistance to impact and heat, and resistant to corrosion and noncorrodible under adverse operating conditions.

Other objects and many of the attendant advantages of this invention will be readily appreciated as the same becomes better understood by reference to the following detailed description of the process and a specific example of different compositions successfully utilizing the principles of the present invention.

The invention basically comprises a mixture of molybdenum disulfide with any suitable thermosetting resin, preferably one which polymerizes rapidly in order to retain the solid particles of molybdenum disulfide in a uniform or homogeneous suspension in the final plastic casting. While a mixture of approximately 30 percent by volume of molybdenum disulfide with 70 percent by volume of a thermosetting resin is believed to be optimum, it will be obvious that these percentages may be varied within relatively wide limits depending on the specific bearing use and the resin utilized, the lower limit depending on the amount of lubrication desired from the molybdenum disulfide and the upper limit being controlled by the amount of molybdenum disulfide which can be retained in suspension without affecting the mechanical strength and hardness of the plastic to an undesirable degree. The percentage of molybdenum disulfide in the mixture probably should not be less than 10 percent or greater than 50 percent in most cases.

The molybdenum disulfide is commercially available in a powdered form which is suitable for use in conjunction with the present invention. The thermosetting resin may be any one of a number of commercially available resins which will polymerize rapidly to form a plastic casting having suitable mechanical characteristics and sufficient hardness to resist impact and high resistance to deterioration from heat.

One resinous composition which is particularly suitable for use in conjunction with the present invention is Example V disclosed in the patent application Serial No. 292,015, filed June 5, 1952, by Edward Rolle. Its composition is as follows:

|  | Percent by weight |
|---|---|
| (a) Unsaturated polyester | 92 |
| (b) A partially hydrogenated polyphenyl mixture | 2 |
| (c) Benzyl alcohol | 2 |
| Benzyl acetate | 2 |
| (d) Beta napthol | 1 |
| (e) Dodecanoic acid (lauric acid) | 1 |
| (f) Ditertiary butyl peroxide, 2 drops per 100 grams of resin, methyl ethyl ketone peroxide, 2 drops per 100 grams of resin. | |

As hereinbefore set forth, any unsaturated polyester resin, of which several suitable examples are given in the aforesaid copending patent application of Edward Rolle, may be used in forming the bearing of the present invention. The unsaturated polyester resins are formed by reacting polybasic acids and anhydrides thereof selected from the group consisting of phthalic, succinic, adipic, sebacic, maleic acids and anhydrides thereof with at least one polyhydric alcohol selected from the group consisting of ethylene glycol, diethylene glycol, triethylene glycol, glycerol, sorbitol, and other higher glycols, and monomeric styrene. Unsaturated polyesters of the above type are marketed under various tradenames such as "Kriston," "Laminac," "Marco," "Paraplex," "Plaskon," "Selectron," and "Vibrin." Unsaturated polyesters of this general type may be indicated by the following representative formula:

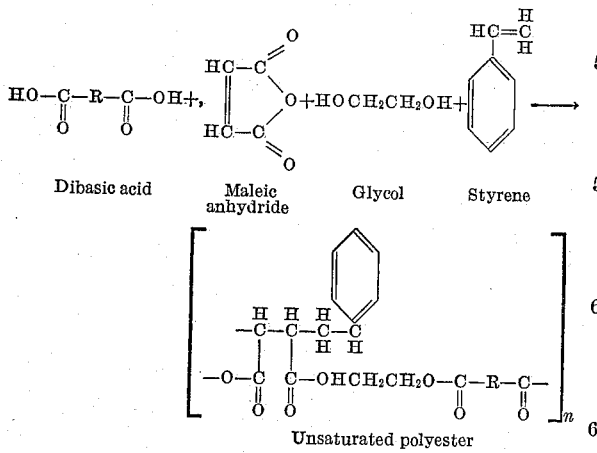

As set forth in greater deail in said aforesaid copending application of Edward Rolle, a partially hydrogenated polyphenyl mixture containing a predominant amount of hydrogenated isomeric terphenyls is commercially available under the trade name HB-40.

All of the above chemicals should be as pure as possible and (c), (d) and (e) should be of U. S. P. quality. Chemical (d) should be powdered and thoroughly ground with mortar and pestle immediately before mixing the composition. All of the added ingredients, that is, all except the unsaturated polyester, are preferably mixed together, then added to the unsaturated polyester and finally thoroughly mixed, preferably by a mechanical mixer until all of the solid ingredients are completely dissolved and without stirring any air into the viscous liquid composition. Ingredient (f) should be added last in preparing the resinous compositions, and the molybdenum disulfide, approximately 30 percent by volume, should be added immediately thereafter to about 70 percent by volume of the resinous compositions and thoroughly mixed using a mechanical mixer.

This plastic polymerizes with extreme rapidity so that it is absolutely necessary to avoid any bubbles forming during the mixing and pouring of the resin, since they will be entrapped by the rapid polymerization. As soon as possible after the moylbdenum disulfide is thoroughly distributed, the mixture should be poured into a suitable mold to form the desired bearing. Particularly with large castings the mold should be immediately subjected to refrigeration, preferably at from 15 to −10 degrees centigrade for a period of four to six hours, after which the casting may be removed and allowed to stand at room temperature to complete the polymerization which is slightly retarded in later stages under refrigeration. If desired, the casting may be cured in an oven at temperatures up to 46 degrees centigrade to facilitate the complete polymerization of the plastic.

While the machine part may be used as cast for its intended purpose, it is preferable to expose the molybdenum disulfide on the bearing surface by machining the bearing surface accurately to the dimensions and shape desired. This exposes the particles of molybdenum disulfide which tend to spread over the entire bearing surface after a short period of operation.

The specific composition formulated as indicated above has excellent machineability, high impact strength and toughness, a high rate of elastic recovery, a hardness on the Rockwell scale of 90 or greater and is not subject to corrosion by oils, seawater, acids, alkalies and most organic solvents. Machine parts formed from this plastic withstand localized temperatures well over 400 degrees Fahreheit without losing their dimensional stability or breaking down due to high spot temperatures on the bearing surface and can operate continuously in a relatively high temperature atmosphere, particularly where the surfaces are in contact with metal to dissipate heat and protect the plastic from oxidation or decomposition.

While it is usually unnecessary to incorporate any reinforcing materials in the plastic, it will be obvious that such reinforcing agents can be employed, if desired, or metallic inserts can be provided, particularly with the resin utilized in the specific example which was one of those disclosed for encapsulating electronic circuits and other metallic objects. The bearing may, if desired, be cast directly in a suitable recess provided at an appropriate point in the machine.

The composition of the present invention may be utilized for all types of rotary bearings, gears, cams, thrust bearings, roller and ball bearings, non-cylindrical bearings for sliding members, bearing plates and members in oscillating motion.

The plastic composition of the present invention is particularly valuable for machine application such as textile machinery and food handling machinery, where common lubricants would damage the product, and for household equipment and other mechanisms such as instruments which are subject to infrequent or no lubrication. It is also especially advantageous for use in making mechanisms such as pulleys and parts of machinery which are subject to out-door exposure or exposure to other corrosive conditions such as the bearings for propeller shafts on ships to replace the commonly used lignum vitae which is rapidly becoming rare. The material is also particularly suitble for applications where it is desirable to prevent the flow of electrical current or charges between two members moving with respect to each other, for insulation against vibration, sound or heat, and where the parts are subject to corrosion or attack by oils, acids, seatwater, alkalies and some organic solvents.

Obviously many modifications and variations of the present invention are possible in the light of the above teachings. It is therefore to be understood that within the scope of the appended claims the invention may be practiced otherwise than as specifically described.

What is claimed is:

1. A thermosetting resinous composition comprising a mixture of about 50 to about 90 percent by volume of a rapidly polymerizing liquid thermosetting resin consisting of about 85 to 95 percent by weight of an unsaturated polyester liquid resin formed by reacting polybasic acids and anhydrides thereof selected from the group consisting of succinic, phthalic, adipic, sebacic and maleic acids and anhydrides thereof with at least one polyhydric alcohol from the group consisting of ethylene glycol, diethylene glycol, triethylene glycol, glycerol, sorbitol and other higher glycols, and monomeric styrene, minor proportions of less than about 3 percent by weight of a partially hydrogenated polyphenyl mixture containing a predominant amount of hydrogenated isomeric terphenyls, of less than about 3 percent by weight of benzyl alcohol, of less than about 2 percent by weight of beta naphthol, of less than about 3 percent by weight of a monobasic acid selected from the group consiting of oleic acid and dodecanoic acid, and less than about 4 percent by weight of at least one organic peroxide selected from the group consisting of benzoyl peroxide, acetal peroxide, ditertiary butyl peroxide, and methyl ethyl ketone peroxide; and about 10 to about 50 percent by volume of molybdenum disulfide thoroughly and uniformly dispersed in said thermosetting resin.

2. A thermosetting resinous composition for forming machine parts having bearing surfaces comprising a mixture of about 50 to about 90 percent by volume of a rapidly polymerizing liquid thermosetting resin consisting of about 92 percent by weight of an unsaturated polyester liquid resin formed by reacting polybasic acids and anhydrides thereof selected from the group consisting of succinic, phthalic, adipic, sebacic, and maleic acids and anhydrides thereof with at least one polyhydric alcohol from the group consisting of ethylene glycol, diethylene glycol, triethylene glycol, glycerol, sorbitol and other higher glycols, and monomeric styrene, about 2 percent by weight of a partially hydrogenated polyphenyl mixture containing a predominant amount of hydrogenated isomeric terphenyls, about 2 percent by weight of benzyl alcohol, about 2 percent by weight of benzyl acetate, about 1 percent by weight of beta naphthol, about 1 percent by weight of dodecanoic acid, about 2 drops per 100 grams of resin of ditertiary butyl peroxide, and about 2 drops per 100 grams of resin of methyl ethyl ketone peroxide; and about 10 to about 50 percent by volume of molybdenum disulfide thoroughly and uniformly dispersed in said thermosetting resin.

3. A method of forming a machine part having a bearing surface comprising the steps of casting said part in a mold from a mixture of about 50 to about 90 percent by volume of a rapidly polymerizing liquid thermosetting resin consisting of about 92 percent by weight of an unsaturated polyester liquid resin formed by reacting polybasic acids and anhydrides thereof selected from the group consisting of succinic, phthalic, adipic, sebacic, and maleic acids and anhydrides thereof with at least one polyhydric alcohol from the group consisting of ethylene glycol, diethylene glycol, triethylene glycol, glycerol, sorbitol and other higher glycols, and monomeric styrene, about 2 percent by weight of a partially hydrogenated polyphenyl mixture containing a predominant amount of hydrogenated isomeric terphenyls, about 2 percent by weight of benzyl alcohol, about 2 percent by weight of benzyl acetate, about 1 percent by weight of beta naphthol, about 1 percent by weight of dodecanoic acid, about 2 drops per 100 grams of resin of ditertiary butyl peroxide, and about 2 drops per 100 grams of resin of methyl ethyl ketone peroxide; and about 10 to 50 percent by volume of molybdenum disulfide thoroughly dispersed in said thermosetting resin, polymerizing said resinous mixture under refrigeration at temperatures from about 15 degrees centigrade to about −10 degrees centigrade, completing the polymerization at temperatures from room temperature to about 46 degrees centigrade, and machining the bearing surfaces of said casting to expose the particles of molybdenum disulfide dispersed therein.

References Cited in the file of this patent

UNITED STATES PATENTS

| | | |
|---|---|---|
| 1,541,336 | Ellis | June 9, 1925 |
| 2,514,389 | Glick | July 11, 1950 |
| 2,686,155 | Willis et al. | Aug. 10, 1954 |

FOREIGN PATENTS

| | | |
|---|---|---|
| 525,682 | Great Britain | Sept. 3, 1940 |

OTHER REFERENCES

Research (London), vol. 3, August 1950, pages 384–385.